United States Patent [19]
Kobayashi et al.

[11] 3,880,526
[45] Apr. 29, 1975

[54] METHOD AND APPARATUS FOR MEASURING THE TURBIDITY OF FLUIDS

[75] Inventors: Goro Kobayashi, Oiso-machi; Noboru Murata, Fuchu, both of Japan

[73] Assignees: OKI Electric Industry Co., Ltd.; Japan Society for the Promotion of Machine Industry, both of Tokyo, Japan

[22] Filed: Dec. 21, 1973

[21] Appl. No.: 427,217

[30] Foreign Application Priority Data
Dec. 28, 1972 Japan.............................. 47-130201

[52] U.S. Cl.................................. 356/208; 356/204
[51] Int. Cl.............................................. G01n 21/24
[58] Field of Search........... 356/201, 204, 205, 207, 356/208

[56] References Cited
UNITED STATES PATENTS

| | | |
|---|---|---|
| 2,808,755 | 10/1957 | Millen.................................. 356/205 |
| 3,623,817 | 11/1971 | Celio................................... 356/205 |
| 3,700,330 | 10/1972 | Davis................................... 356/205 |
| 3,761,724 | 9/1973 | Dennis................................. 356/205 |

Primary Examiner—Ronald L. Wibert
Assistant Examiner—Richard A. Rosenberger
Attorney, Agent, or Firm—Charles W. Helzer

[57] ABSTRACT

In a method of measuring the turbidity of fluid wherein light is transmitted through the fluid to be measured, the straightforwardly transmitted light and the light scattered by the contaminant contained in the fluid are detected by photoelectric converting means, and the outputs from the photoelectric converting means respectively corresponding to the straightforwardly transmitted light and the scattered light are compared to determine the turbidity of the fluid, a single laser beam is divided into two parallel laser light rays, the two parallel laser light rays are interrupted alternately and cyclically, the interrupted laser light rays are projected into the fluid in different directions, the laser light rays straightforwardly transmitted through the fluid and the laser light rays scattered by the contaminant in the fluid are received by a single photoelectric converting element, thus producing alternate pulses respectively corresponding to the straightforwardly transmitted laser light rays and the scattered laser light rays, and the alternate pulses are separated and compared with each other to determine the turbidity of the fluid.

10 Claims, 5 Drawing Figures

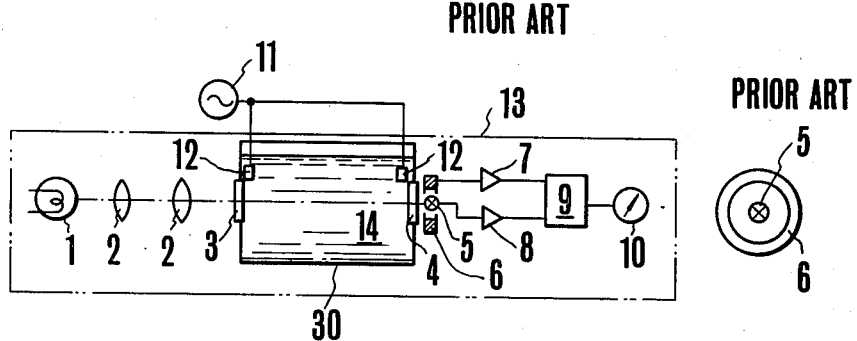
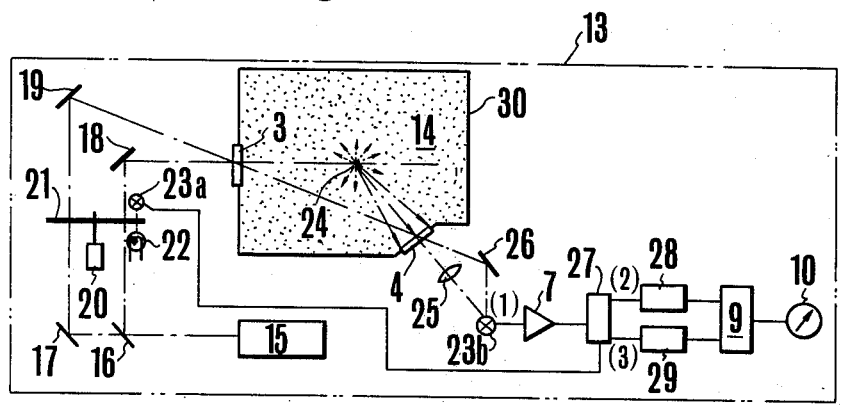
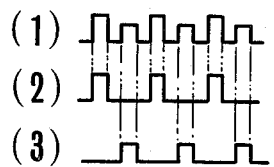
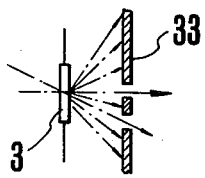

METHOD AND APPARATUS FOR MEASURING THE TURBIDITY OF FLUIDS

BACKGROUND OF THE INVENTION

This invention relates to a method and apparatus for measuring the turbidity of fluid.

According to one method of measuring the turbidity of liquid or gas, the Lambert-Beer's law is used wherein the degree of transmissibility to scattering of light is measured to calculate the degree of turbidity, and an apparatus as shown in FIG. 1 which utilizes the scattering of light is used most widely.

Apparatus for measuring the degree of turbidity of liquid by utilizing the ratio of transmitted to scattered light comprises a source of light 1 in the form of a tungsten lamp, lenses 2 for collecting the light from the light source 1 and converting it into parallel light rays, and a container 30 for containing liquid 14 to be measured and provided with opposing glass windows 3 and 4. Near these glass windows are disposed vibrators 12 energized by a ultra-sonic wave oscillator 11 for producing ultra-sonic waves for cleaning the glass windows. Photoelectric converting elements 5 and 6 are positioned on the outside of output glass window 4 and are coupled to a ratio circuit 9 through amplifiers 8 and 7 respectively. The output of the ratio circuit 9 is coupled to an indicating meter 10. Various elements described above excepting the ultra-sonic wave oscillator 11 are housed in an air tight casing 13. As shown in FIG. 2, the photoelectric converting element 6 takes the form of an annular ring and the photoelectric converting element 5 is positioned at the center of the ring.

The principle of operation of the apparatus thus described is as follows: The operation of the apparatus is based on the fact that as the light rays from light source 1 transmit through the liquid 14 to be measured the transmissibility and the quantity of the scattered light vary depending upon the degree of turbidity of the liquid. The photoelectric converting element 5 located at the center responds to the light transmitted through the liquid, whereas the ring shaped photoelectric converting element 6 responds to the scattered light. The ratio circuit 9 operates to obtain the ratio between electrical outputs from photoelectric converting elements 5 and 6 thereby displaying the ratio by indicating meter 10. However, such apparatus has following disadvantages:

1. Since a tungsten lamp is used as the light source 1, the property of condensing the light and light energy are low, so that measuring of high degree of turbidity is not possible.
2. Since two photoelectric converting elements 5 and 6 are used, difference in the initial characteristics, temperature characteristics and aging characteristics of the two elements results in errors.
3. Although input and output windows 3 and 4 are constantly cleaned by super sonic waves, after long period, they become contaminated. Consequently, the quantity of light transmitting through these windows decreases partially or wholly, thus causing errors.
4. As a tungsten lamp is used as the light source 1, the distribution of the spectrum of the light emanated by the lamp is wide so that error is inevitable for materials contained in the liquid that absorb lights of particular wavelengths.

SUMMARY OF THE INVENTION

Accordingly, it is an object of this invention to provide an improved method and apparatus capable of eliminating these disadvantages.

In accordance with one aspect of this invention, there is provided a method of measuring the turbidity of fluid wherein light is transmitted through the fluid to be measured, the straightforwardly transmitted light and the light scattered by the contaminant contained in the fluid are detected by photoelectric converting means, and the outputs from the photoelectric converting means respectively corresponding to the straightforwardly transmitted light and the scattered light are compared to determine the turbidity of the fluid, characterized in that a single laser light beam is divided into two parallel laser light rays, that the two parallel laser light rays are interrupted alternately and cyclically, that the interrupted laser light rays are projected into the fluid in different directions, that the laser light rays straightforwardly transmitted through the fluid and the laser light rays scattered by the contaminant in the liquid are received by a single photoelectric converting element thus producing alternate pulses respectively corresponding to the straightforwardly transmitted laser light rays and the scattered laser light rays and that the alternate pulses are separated and compared with each other to determine the turbidity of the fluid.

According to another aspect of this invention, there is provided apparatus for measuring the turbidity of fluid of the class wherein light is transmitted through the fluid to be measured, the straightforwardly transmitted light and the light scattered by the contaminant contained in the fluid are detected by photoelectric converting means, and the outputs from the photoelectric converting means respectively corresponding to the straightforwardly transmitted light and the scattered light are compared with each other to determine the turbidity of the fluid, characterized in that there are provided a container for the fluid, the container being provided with opposing input and output windows, a source of laser light, means to divide the laser light into two parallel laser light rays, means to alternately and cyclically interrupt the two parallel laser light rays, means to transmit one of the interrupted laser light rays straightforwardly through the input and output windows, means to transmit the other of the interrupted laser light rays through the input window at an angle not to directly reach the output window, a single photoelectric converting element disposed on the outside of the output window for receiving the straightforwardly transmitted laser light rays and the other laser light rays transmitted through the input window and scattered by the contaminant in the fluid for producing alternate pulses respectively corresponding to the straightforwardly transmitted laser light rays and the scattered laser light rays, means for separating the alternate pulses, and means for comparing the separated pulses to determine the turbidity of the fluid.

BRIEF DESCRIPTION OF THE DRAWING

In the accompanying drawing:

FIG. 1 is a schematic representation of a prior art apparatus for measuring the turbidity of fluid utilizing scattered light;

FIG. 2 shows an arrangement of two photoelectric converting elements utilized in the apparatus shown in FIG. 1;

FIG. 3 is a schematic representation of a turbidity measuring apparatus embodying the invention;

FIG. 4 shows waveforms to explain the operation of the apparatus shown in FIG. 3 and FIG. 5 is an enlarged view of a portion of the apparatus shown in FIG. 2.

DESCRIPTION OF THE PREFERRED EMBODIMENT

Referring now to FIG. 3, reference numerals 3, 4, 7, 9, 13, 14 and 10 represent the same elements as those shown in FIG. 1. In this example, the source of light takes the form a laser oscillator 15 producing parallel laser light rays. The laser light is transmitted to input window 3 via a half mirror 16 and a reflecting mirror 18 on one hand and via reflecting mirrors 17 and 19 on the other hand. A shutter 21 in the form of an opaque circular disc provided with perforations, not shown, and driven by an electric motor 20 is disposed across said two light paths. An electric lamp 22 and a photoelectric converting element 23a are disposed on the opposite sides of the shutter 21 for producing a synchronizing current. The output window 4 is positioned to receive the light reflected by reflecting mirror 19 and transmitting straightforwardly through the liquid 14. The light transmitting through output window 4 is sent to a photoelectric converting element 23b via a reflecting mirror 26. One of the particles, suspended in the liquid or gas 14 and causing turbidity is shown by a reference numeral 24 and the light reflected by the reflecting mirror 18 impinges upon the particles 24 and scattered thereby. A portion of such scattered light is projected upon the photoelectric converting element 23b via output window 4 and a condenser lens 25. The output from the photoelectric converting element 23b is coupled to one input of a gate circuit 27 via amplifier 7 and the output from the photoelectric converting element 23a is coupled to the other input of the gate circuit 27. Two outputs from the gate circuit are coupled to ratio circuit 9 respectively through memory circuits 28 and 29.

As shown in FIG. 5, a slotted mask 33 is provided on the inside of the input window 3 for preventing adverse effects on the measurement by light scattered from the inner surface of the input window 3. In FIG. 4, curve (1) represents the waveform of the output from the photoelectric converting element 23b, while curves (2) and (3) the waveforms of the outputs from the gate circuit 27.

In operation, light rays reflected by reflecting mirrors 18 and 19 transmit through the input window 3 in different directions. As the light rays reflected by the reflecting mirror 19 transmit through the fluid 14 along a straight line, they produce a large output in the photoelectric converting element 23b. On the other hand, the laser light rays reflected by the reflecting mirror 18 are scattered by the particles in the fluid and only a portion of the scattered rays is projected upon the photoelectric converting element 23b, thus producing smaller output.

As the light rays reflected by reflecting mirrors 18 and 19 are interrupted alternately by shutter 21, the output from the photoelectric converting element 23b comprises alternate pulses respectively representing straightforwardly transmitted light and the scattered light as shown by curve (1) of FIG. 4.

Although not shown in the drawing, in addition to perforations for interrupting light rays reflected by reflecting mirrors 18 and 19, respectively, the shutter 21 is provided with a series of perforations on the peripheral portion thereof between lamp 22 and photoelectric converting element 23a for producing a synchronizing signal which is applied to one input of the gate circuit 27. Accordingly, the output from the photoelectric converting element 23b is decomposed into a component representing the straightforwardly transmitted light as shown by curve (2) in FIG. 4 and a component representing the scattered light as shown by curve (3) in FIG. 4. These components are stored in memory circuits 28 and 29 respectively, and the output from the ratio circuit 9 representing the ratio between the voltages of the memory circuits 28 and 29 represents the degree of turbidity of the fluid 14 which is displayed by indicating meter 10.

When the inner surface of the input window 3 is contaminated by the contaminants contained in the fluid 14, light will be scattered by the contaminated surface as shown by dotted lines in FIG. 5, thus causing errors in the result of measurement. However, by providing mask 33 provided with perforations that permit transmission of only the light utilized for measurement in front of the window 3, it is possible to eliminate the effect of the scattered light thus eliminating the error.

Any other suitable arrangement than that illustrated can be used for generating the synchronizing signal which is used to actuate the gate circuit 27. For example, a frequency obtained by dividing the frequency of the source voltage utilized to energize driving motor 20 of the shutter 21 can be used as the synchronizing signal. Alternatively, a magnet may be secured to the periphery of the shutter 21 so that the position of the magnet may be detected by a pick up coil which produces an electric signal utilized as the synchronizing signal. Similarly, instead of using a perforated shutter 21, light intercepting members operated electrically or mechanically may be provided for respective light paths so as to alternately and cyclically open and close the light paths and to enable and disenable the gate circuit 27 in synchronism with the opening and closing of the light paths.

As has been described hereinabove, according to the method and apparatus of this invention, a source of laser light having a single wavelength and a large energy is used as the source of light, the same portions of the input and output windows are used for the passage of the straightforwardly transmitting light and the scattered light, and a single photoelectric converting element is used commonly for detecting the straightforwardly transmitted light and the scattered light so that all of the aforementioned defects 1 through 4 of the prior art method and apparatus can be obviated.

More particularly, as the laser light has a large energy it is possible to measure extremely turbit fluids even muddiness. Moreover, as the laser light has a single wavelength even when a portion of the laser light is absorbed by the contaminant or even when the surfaces of the input and output windows are contaminated, the straightforwardly transmitting light and the scattered light passing through the same portion of the output window are subjected to the same degree of attenuation so that the ratio of these two lights would not be changed thus eliminating any error that otherwise might have been caused by the contamination in the result of measurement. Furthermore, use of a single photoelectric converting element for detecting the straightforwardly transmitted light and the scattered light eliminates the chance of causing measurement errors which are inevitable when a plurality of photoelectric converting elements having different characteristic are used.

Moreover, as no moving element in contact with the liquid to be measured is used, the apparatus of this invention can operate stably for the measurement of corrosive fluids as well as fluids under high pressures.

The method and apparatus of this invention are suitable for the measurement of turbidity of sea water, waste water exhausted from factories and river water.

While the invention has been shown and described in terms of a preferred embodiment thereof, it should be understood that many changes and modifications will readily occur to one skilled in the art without departing from the spirit and scope of the invention as defined in the appended claims.

What is claimed is:

1. In a method of measuring the turbidity of fluid wherein two separate light beams are transmitted through the fluid to be measured in the form of a straightforwardly transmitted light beam and light rays which are scattered by the contaminant contained in said fluid, the two light beams being detected by photoelectric converting means after passing through the fluid to be measured to produce respective output signals from said photoelectric converting means respectively corresponding to said straightforwardly transmitted light and said scattered light rays, and the two output signals are compared to determine the turbidity of said fluid, the improvement which comprises producing a finely focused, intense laser beam of monochromatic light with a single laser device, dividing said beam into two separate laser light rays, alternately and cyclically interrupting said two laser light rays, projecting both of said interrupted laser light rays into said fluid to be measured at a common point in two different directions to form said straightforwardly transmitted light beam and said scattered light beam, respectively, receiving the laser light rays straightforwardly transmitted through said fluid and the scattered laser light rays scattered by the contaminant in said fluid by means of a single photoelectric converting element thus producing alternate output signal pulses respectively corresponding to said straightforwardly transmitted laser light rays and said scattered laser light rays, separating said alternate output signal pulses and comparing said separated output signal pulses to determine the turbidity of said fluid.

2. The method according to claim 1 wherein said two separate laser light rays are interrupted by a rotary shutter in the form of a disc provided with perforations.

3. The method according to claim 1 wherein said fluid to be measured is contained in a container provided with an input window and an output window, one of said interrupted laser light rays being transmitted straightforwardly through said input and said output windows to impinge on said photoelectric converting means and the other interrupted laser light ray being transmitted through said input window at the same point through which the first interrupted light ray is transmitted but at an angle so as not to directly reach the output window, and only scattered rays therefrom pass through the window to impinge on said photoelectric converting means.

4. The method according to claim 2 wherein said alternate output signal pulses produced by said photoelectric converting means are applied to a gate circuit which is enabled and disenabled by a synchronizing signal generated by said rotary shutter for separating said alternate output signal pulses, and said separated, alternate output signal pulses are applied as the respective signal inputs to ratio circuit means to determine their ratio as an indication of the turbidity of the fluid being measured.

5. The method according to claim 1 wherein said fluid to be measured is contained in a container provided with an input window and an output window, one of said interrupted laser light rays being transmitted straightforwardly through said input and said output windows to impinge on said photoelectric converting means and the other interrupted laser light ray being transmitted through said input window at the same point through which the first interrupted light ray is transmitted but at an angle so as not to directly reach the output window and only scattered rays therefrom pass through the window to impinge on said photoelectric converting means.

6. In apparatus for measuring the turbidity of fluid of the type wherein two separate light beams are transmitted through the fluid to be measured in the form of a straightforwardly transmitted light beam and light rays which are scattered by the contaminant contained in the fluid, the light beam and scattered light rays being detected by photoelectric converting means after passing through the fluid to produce respective output signals from said photoelectric converting means respectively corresponding to said straightforwardly transmitted light beam and said scattered light rays, and the two output signals are compared with each other to determine the turbidity of said fluid, the improvement which comprises a container for the fluid to be measured, said container being provided with opposing input and output windows, a single laser device for producing a finely focused, intense beam of monochromatic light, means to divide said laser beam into two separate laser light rays, means to alternately and cyclically interrupt said two separate laser light rays, means to transmit one of said interrupted laser light rays straightforwardly through said input and output windows of said container to form a straightforwardly transmitted laser light ray, means to transmit the alternate other one of said interrupted laser light rays through said input window at the same point through which the first interrupted light ray is transmitted but at an angle so as not to directly reach said output window and only scattered light rays scattered from said alternate other one of said interrupted laser light rays by the contaminants in said fluid pass through the output window, a single photoelectric converting means disposed on the outside of said output window for receiving said straightforwardly transmitted laser light rays and said scattered laser light rays, said photoelectric converting means producing alternate output signal pulses respectively corresponding to said straightforwardly transmitted laser light rays and said scattered laser light rays, means for separating said alternate output signal pulses, and means for comparing said separated output signal pulses to determine the turbidity of said fluid.

7. The apparatus according to claim 6 wherein said means to alternately and cyclically interrupt said two separate laser light rays comprises a rotary shutter.

8. The apparatus according to claim 7 wherein said means for separating said alternate output signal pulses comprises a gate circuit having two input terminals, one connected to receive the output from said photoelectric converting element and the other connected to receive a synchronizing signal pulse, and synchronizing signal pulse generating means coacting with said rotary shutter to derive said synchronizing signal pulse.

9. The apparatus according to claim 8 wherein said rotary shutter is in the form of a perforated disc and said synchronizing pulse generating means comprises a source of light and a photoelectric converting element which are positioned on the opposite sides of said rotary shutter.

10. The apparatus according to claim 8 wherein said separated output signal pulses are stored in respective memory means, and said means for comparing said separated pulses comprises ratio circuit means for determining the ratio between the output signals of said respective memory means.

* * * * *